US009123231B1

(12) United States Patent
Morgan et al.

(10) Patent No.: US 9,123,231 B1
(45) Date of Patent: *Sep. 1, 2015

(54) METHODS AND SYSTEMS RELATED TO REMOTE POWER LOSS DETECTION

(71) Applicant: **Gordon*Howard Associates, Inc.**, Littleton, CO (US)

(72) Inventors: Gerald A. Morgan, Littleton, CO (US); Christopher M. Macheca, Centennial, CO (US); Rodney P. Landers, Woodbury, MN (US)

(73) Assignee: **GORDON*HOWARD ASSOCIATES, INC.**, Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/712,401

(22) Filed: May 14, 2015

Related U.S. Application Data

(63) Continuation of application No. 14/552,631, filed on Nov. 25, 2014, now Pat. No. 9,045,103, which is a continuation of application No. 13/828,182, filed on Mar. 14, 2013, now Pat. No. 8,928,471.

(51) Int. Cl.
*B60R 25/10* (2013.01)
*G08B 21/18* (2006.01)

(52) U.S. Cl.
CPC .................................... *G08B 21/185* (2013.01)

(58) Field of Classification Search
CPC ............................... B60R 25/00; B60R 25/102
USPC ......................................................... 340/654
See application file for complete search history.

(56) References Cited

U.S. PATENT DOCUMENTS

| 4,335,370 A | 6/1982 | Scalley et al. |
| 4,592,443 A | 6/1986 | Simon |
| 4,624,578 A | 11/1986 | Green |
| 4,688,026 A | 8/1987 | Scribner et al. |

(Continued)

FOREIGN PATENT DOCUMENTS

| EP | 1557807 | 7/2005 |
| KR | 10-2004-0073816 | 8/2004 |

(Continued)

OTHER PUBLICATIONS

US 5,699,633, Oct. 1999, Roser (withdrawn).

(Continued)

*Primary Examiner* — Steven Lim
*Assistant Examiner* — Omeed Alizada
(74) *Attorney, Agent, or Firm* — Mark E. Scott; Conley Rose, P.C.

(57) ABSTRACT

Remote power loss detection. At least some of the example embodiments are methods including: tracking location of an asset by an onboard device mechanically coupled to the asset, the onboard device electrically coupled to a source of power of the asset, and the onboard device receiving power from the asset; charging a supercapacitor coupled to the onboard device; and then detecting a complete loss of power provided to the onboard device, and the detecting by the onboard device; and after the complete loss of power sending a message by wireless transmission, the sending based on power derived from the supercapacitor, and the message including an indication of a last known voltage provide by the asset prior to the complete loss of power, and the sending by the onboard device after the complete loss of power.

15 Claims, 5 Drawing Sheets

(56) References Cited

U.S. PATENT DOCUMENTS

| | | | |
|---|---|---|---|
| 4,700,296 A | 10/1987 | Palmer, Jr. et al. |
| 4,736,294 A | 4/1988 | Gill et al. |
| 4,738,333 A | 4/1988 | Collier et al. |
| 4,800,590 A | 1/1989 | Vaughan |
| 5,014,206 A | 5/1991 | Scribner et al. |
| 5,132,968 A | 7/1992 | Cephus |
| 5,228,083 A | 7/1993 | Lozowick et al. |
| 5,426,415 A | 6/1995 | Prachar et al. |
| 5,490,200 A | 2/1996 | Snyder et al. |
| 5,495,531 A | 2/1996 | Smiedt |
| 5,510,780 A | 4/1996 | Norris et al. |
| 5,619,573 A | 4/1997 | Brinkmeyer et al. |
| 5,673,318 A | 9/1997 | Bellare et al. |
| 5,708,712 A | 1/1998 | Brinkmeyer et al. |
| 5,775,290 A | 7/1998 | Staerzl et al. |
| 5,797,134 A | 8/1998 | McMillan et al. |
| 5,818,725 A | 10/1998 | McNamara et al. |
| 5,819,869 A | 10/1998 | Horton |
| 5,898,391 A | 4/1999 | Jefferies et al. |
| 5,917,405 A | 6/1999 | Joao |
| 5,940,812 A | 8/1999 | Tengel et al. |
| 5,969,633 A | 10/1999 | Rosler |
| 5,970,143 A | 10/1999 | Schneier et al. |
| 6,025,774 A | 2/2000 | Forbes |
| 6,026,922 A | 2/2000 | Horton |
| 6,032,258 A | 2/2000 | Godoroja et al. |
| 6,064,970 A | 5/2000 | McMillan et al. |
| 6,088,143 A | 7/2000 | Bang |
| 6,130,621 A | 10/2000 | Weiss |
| 6,157,317 A | 12/2000 | Walker |
| 6,185,307 B1 | 2/2001 | Johnson, Jr. |
| 6,195,648 B1 | 2/2001 | Simon et al. |
| 6,225,890 B1 | 5/2001 | Murphy |
| 6,232,874 B1 | 5/2001 | Murphy |
| 6,233,566 B1 | 5/2001 | Levine et al. |
| 6,249,217 B1 | 6/2001 | Forbes |
| 6,249,227 B1 | 6/2001 | Brady et al. |
| 6,278,936 B1 | 8/2001 | Jones |
| 6,353,776 B1 | 3/2002 | Rohrl et al. |
| 6,370,649 B1 | 4/2002 | Angelo et al. |
| 6,380,848 B1 | 4/2002 | Weigl et al. |
| 6,401,204 B1 | 6/2002 | Euchner et al. |
| 6,429,773 B1 | 8/2002 | Schuyler |
| 6,489,897 B2 | 12/2002 | Simon |
| 6,587,739 B1 | 7/2003 | Abrams et al. |
| 6,601,175 B1 | 7/2003 | Arnold et al. |
| 6,611,201 B1 | 8/2003 | Bishop et al. |
| 6,611,686 B1 | 8/2003 | Smith et al. |
| 6,615,186 B1 | 9/2003 | Kolls |
| 6,665,613 B2 | 12/2003 | Duvall |
| 6,693,517 B2 | 2/2004 | McCarthy et al. |
| 6,714,859 B2 | 3/2004 | Jones |
| 6,717,527 B2 | 4/2004 | Simon |
| 6,741,927 B2 | 5/2004 | Jones |
| 6,804,606 B2 | 10/2004 | Jones |
| 6,812,829 B1 | 11/2004 | Flick |
| 6,816,089 B2 | 11/2004 | Flick |
| 6,816,090 B2 | 11/2004 | Teckchandani et al. |
| 6,828,692 B2 | 12/2004 | Simon |
| 6,868,386 B1 | 3/2005 | Henderson et al. |
| 6,870,467 B2 | 3/2005 | Simon |
| 6,873,824 B2 | 3/2005 | Flick |
| 6,888,495 B2 | 5/2005 | Flick |
| 6,917,853 B2 | 7/2005 | Chirnomas |
| 6,924,750 B2 | 8/2005 | Flick |
| 6,950,807 B2 | 9/2005 | Brock |
| 6,952,645 B1 | 10/2005 | Jones |
| 6,961,001 B1 | 11/2005 | Chang et al. |
| 6,972,667 B2 | 12/2005 | Flick |
| 6,985,583 B1 | 1/2006 | Brainard et al. |
| 6,993,658 B1 | 1/2006 | Engberg et al. |
| 7,005,960 B2 | 2/2006 | Flick |
| 7,015,830 B2 | 3/2006 | Flick |
| 7,020,798 B2 | 3/2006 | Meng et al. |
| 7,031,826 B2 | 4/2006 | Flick |
| 7,031,835 B2 | 4/2006 | Flick |
| 7,039,811 B2 | 5/2006 | Ito |
| 7,053,823 B2 | 5/2006 | Cervinka et al. |
| 7,061,137 B2 | 6/2006 | Flick |
| 7,091,822 B2 | 8/2006 | Flick et al. |
| 7,103,368 B2 | 9/2006 | Teshima |
| 7,123,128 B2 | 10/2006 | Mullet et al. |
| 7,124,088 B2 | 10/2006 | Bauer et al. |
| 7,133,685 B2 | 11/2006 | Hose et al. |
| 7,142,089 B2 | 11/2006 | Yamagishi |
| 7,149,623 B2 | 12/2006 | Flick |
| 7,205,679 B2 | 4/2007 | Flick |
| 7,224,083 B2 | 5/2007 | Flick |
| 7,266,507 B2 | 9/2007 | Simon et al. |
| 7,292,152 B2 | 11/2007 | Torkkola et al. |
| 7,299,890 B2 | 11/2007 | Mobley |
| 7,310,618 B2 | 12/2007 | Libman |
| 7,323,982 B2 | 1/2008 | Staton et al. |
| 7,327,250 B2 | 2/2008 | Harvey |
| 7,379,805 B2 | 5/2008 | Olsen, III et al. |
| 7,389,916 B2 | 6/2008 | Chirnomas |
| 7,427,924 B2 | 9/2008 | Ferrone et al. |
| 7,542,921 B1 | 6/2009 | Hildreth |
| 7,561,102 B2 | 7/2009 | Duvall |
| 7,814,005 B2 | 10/2010 | Imrey et al. |
| 7,818,254 B1 | 10/2010 | Ma |
| 7,823,681 B2 | 11/2010 | Crespo et al. |
| 7,873,455 B2 | 1/2011 | Arshad et al. |
| 7,877,269 B2 | 1/2011 | Bauer et al. |
| 7,904,332 B1 | 3/2011 | Merkley |
| 7,930,211 B2 | 4/2011 | Crolley |
| 8,018,329 B2 | 9/2011 | Morgan et al. |
| 8,086,523 B1 | 12/2011 | Palmer |
| 8,095,394 B2 | 1/2012 | Nowak et al. |
| 8,140,358 B1 | 3/2012 | Ling et al. |
| 8,217,772 B2 | 7/2012 | Morgan et al. |
| 8,325,025 B2 | 12/2012 | Morgan et al. |
| 8,344,894 B2 | 1/2013 | Szczerba et al. |
| 8,370,027 B2 | 2/2013 | Pettersson et al. |
| 8,370,925 B2 | 2/2013 | Childress et al. |
| 8,510,556 B2 | 8/2013 | Cao et al. |
| 8,630,768 B2 | 1/2014 | McClellan et al. |
| 8,653,956 B2 | 2/2014 | Berkobin et al. |
| 8,754,751 B1 | 6/2014 | Piccoli |
| 8,841,987 B1 | 9/2014 | Stanfield et al. |
| 9,002,536 B2 | 4/2015 | Hatton |
| 2001/0040503 A1 | 11/2001 | Bishop |
| 2002/0019055 A1 | 2/2002 | Brown |
| 2002/0091473 A1 | 7/2002 | Gardner et al. |
| 2002/0120371 A1 | 8/2002 | Levian et al. |
| 2002/0120374 A1 | 8/2002 | Douros |
| 2002/0193926 A1 | 12/2002 | Katagishi et al. |
| 2003/0036823 A1 | 2/2003 | Mahvi |
| 2003/0095046 A1 | 5/2003 | Borugian |
| 2003/0101120 A1 | 5/2003 | Tilton |
| 2003/0151501 A1 | 8/2003 | Teckchandani et al. |
| 2003/0191583 A1 | 10/2003 | Uhlmann et al. |
| 2003/0231550 A1 | 12/2003 | McFarlane |
| 2004/0088345 A1 | 5/2004 | Zellner et al. |
| 2004/0153362 A1 | 8/2004 | Bauer et al. |
| 2004/0176978 A1 | 9/2004 | Simon et al. |
| 2004/0177034 A1 | 9/2004 | Simon et al. |
| 2004/0203974 A1 | 10/2004 | Seibel et al. |
| 2004/0204795 A1 | 10/2004 | Harvey et al. |
| 2004/0239510 A1 | 12/2004 | Karsten |
| 2005/0017855 A1 | 1/2005 | Harvey |
| 2005/0024203 A1 | 2/2005 | Wolfe |
| 2005/0030184 A1 | 2/2005 | Victor |
| 2005/0033483 A1 | 2/2005 | Simon et al. |
| 2005/0128080 A1 | 6/2005 | Hall et al. |
| 2005/0134438 A1 | 6/2005 | Simon |
| 2005/0162016 A1 | 7/2005 | Simon |
| 2005/0200453 A1 | 9/2005 | Turner et al. |
| 2005/0270178 A1 | 12/2005 | Ioli |
| 2006/0028431 A1 | 2/2006 | Leong |
| 2006/0059109 A1 | 3/2006 | Grimes |
| 2006/0080599 A1 | 4/2006 | Dubinsky |
| 2006/0100944 A1 | 5/2006 | Reddin et al. |
| 2006/0108417 A1 | 5/2006 | Simon |

(56) References Cited

U.S. PATENT DOCUMENTS

| | | |
|---|---|---|
| 2006/0111822 A1 | 5/2006 | Simon |
| 2006/0122748 A1 | 6/2006 | Nou |
| 2006/0136314 A1 | 6/2006 | Simon |
| 2007/0010922 A1 | 1/2007 | Buckley |
| 2007/0021100 A1 | 1/2007 | Haave et al. |
| 2007/0082614 A1 | 4/2007 | Mock |
| 2007/0139189 A1 | 6/2007 | Helmig |
| 2007/0146146 A1 | 6/2007 | Kopf et al. |
| 2007/0176771 A1 | 8/2007 | Doyle |
| 2007/0185728 A1 | 8/2007 | Schwarz et al. |
| 2007/0194881 A1 | 8/2007 | Schwarz et al. |
| 2007/0222588 A1 | 9/2007 | Wolfe |
| 2007/0285207 A1 | 12/2007 | Bates |
| 2007/0288271 A1 | 12/2007 | Klinkhammer |
| 2007/0299567 A1 | 12/2007 | Simon et al. |
| 2008/0042814 A1 | 2/2008 | Hurwitz et al. |
| 2008/0109378 A1 | 5/2008 | Papadimitriou |
| 2008/0114541 A1 | 5/2008 | Shintani et al. |
| 2008/0150683 A1 | 6/2008 | Mikan et al. |
| 2008/0162034 A1 | 7/2008 | Breen |
| 2008/0221743 A1 | 9/2008 | Schwarz et al. |
| 2008/0223646 A1 | 9/2008 | White |
| 2008/0231446 A1 | 9/2008 | Cresto |
| 2008/0243558 A1 | 10/2008 | Gupte |
| 2008/0245598 A1 | 10/2008 | Gratz et al. |
| 2008/0255722 A1 | 10/2008 | McClellan et al. |
| 2008/0294302 A1 | 11/2008 | Basir |
| 2009/0043409 A1 | 2/2009 | Ota |
| 2009/0051510 A1 | 2/2009 | Follmer et al. |
| 2009/0182216 A1 | 7/2009 | Roushey, III et al. |
| 2009/0234770 A1 | 9/2009 | Simon |
| 2009/0237249 A1 | 9/2009 | Bielas |
| 2009/0248222 A1 | 10/2009 | McGarry et al. |
| 2009/0284359 A1 | 11/2009 | Huang et al. |
| 2009/0295537 A1 | 12/2009 | Lane et al. |
| 2010/0030586 A1 | 2/2010 | Taylor et al. |
| 2010/0045452 A1 | 2/2010 | Periwal |
| 2010/0075655 A1 | 3/2010 | Howarter et al. |
| 2010/0148947 A1 | 6/2010 | Morgan et al. |
| 2010/0238009 A1 | 9/2010 | Cook et al. |
| 2010/0268402 A1 | 10/2010 | Schwarz et al. |
| 2010/0312691 A1 | 12/2010 | Johnson, Jr. |
| 2011/0040630 A1 | 2/2011 | Weiss |
| 2011/0050407 A1 | 3/2011 | Schoenfeld et al. |
| 2011/0057800 A1 | 3/2011 | Sofer |
| 2011/0084820 A1 | 4/2011 | Walter et al. |
| 2011/0148626 A1 | 6/2011 | Acevedo |
| 2011/0153143 A1 | 6/2011 | O'Neil et al. |
| 2011/0210867 A1 | 9/2011 | Benedikt |
| 2011/0270779 A1 | 11/2011 | Showalter |
| 2012/0066011 A1 | 3/2012 | Ichien et al. |
| 2012/0068858 A1 | 3/2012 | Fredkin |
| 2012/0068886 A1 | 3/2012 | Torres |
| 2012/0089423 A1 | 4/2012 | Tamir et al. |
| 2012/0098678 A1 | 4/2012 | Rathmacher et al. |
| 2012/0158356 A1 | 6/2012 | Prochaska et al. |
| 2012/0203441 A1 | 8/2012 | Higgins et al. |
| 2012/0212353 A1 | 8/2012 | Fung et al. |
| 2012/0221216 A1 | 8/2012 | Chauncey et al. |
| 2013/0018677 A1 | 1/2013 | Chevrette |
| 2013/0074107 A1 | 3/2013 | Hyde et al. |
| 2013/0074111 A1 | 3/2013 | Hyde et al. |
| 2013/0074112 A1 | 3/2013 | Hyde et al. |
| 2013/0074115 A1 | 3/2013 | Hyde et al. |
| 2013/0099892 A1 | 4/2013 | Tucker et al. |
| 2013/0127617 A1 | 5/2013 | Baade et al. |
| 2013/0138460 A1 | 5/2013 | Schumann et al. |
| 2013/0141252 A1 | 6/2013 | Ricci |
| 2013/0144460 A1 | 6/2013 | Ricci |
| 2013/0144461 A1 | 6/2013 | Ricci |
| 2013/0144469 A1 | 6/2013 | Ricci |
| 2013/0144770 A1 | 6/2013 | Boling et al. |
| 2013/0144771 A1 | 6/2013 | Boling et al. |
| 2013/0144805 A1 | 6/2013 | Boling et al. |
| 2013/0204455 A1 | 8/2013 | Chia et al. |
| 2014/0191858 A1 | 7/2014 | Morgan et al. |
| 2014/0225724 A1 | 8/2014 | Rankin et al. |
| 2014/0358896 A1 | 12/2014 | Camacho et al. |

FOREIGN PATENT DOCUMENTS

| | | |
|---|---|---|
| WO | 9616845 | 6/1996 |
| WO | 2007092272 | 8/2007 |
| WO | 2007092287 | 8/2007 |
| WO | 2010/068438 A2 | 6/2010 |
| WO | 2012/097441 A1 | 7/2012 |

OTHER PUBLICATIONS

On Time Payment Protection Systems, printed Jan. 2, 2004 from www.ontime-pps.com/how.html, 2 pages.
Aircept Products, printed Jan. 2, 2004 from www. aircept. com/products.html, 1 page.
How PayTeck Works, printed Jan. 2, 2004 from www. payteck.cc/aboutpayteck.html, 1 page.
Article: "Pager Lets You Locate Your Car, Unlock and Start It", published Dec. 10, 1997 in USA Today, 1 page.
Article: "Electronic Keys Keep Tabs on Late Payers", published Sep. 22, 1997 in Nonprime Auto News, 1 page.
Article: "PASSTEC Device Safely Prevents Vehicles from Starting", published Jul. 19, 1999 in Used Car News, 1 page.
Payment Clock Disabler advertisement, published, May 18, 1998, 1 page.
Secure Your Credit & Secure Your Investment (Pay Teck advertisement), printed Jan. 2, 2004 from www. payteck. cc, 1 page.
iMetrik Company Information, printed Dec. 21, 2006 from imetrik. com, 1 page.
About C-CHIP Technologies, printed Dec. 21, 2006 from www.c-chip.com, 1 page.
HI-Tech tools to solve traditional problems, printed Dec. 21, 2006 from www.c-chip.com, 1 page.
C-CHIP Technologies Products: Credit Chip 100, Credit Chip 100C, Credit Chip 200, printed Dec. 21, 2006 from www. c-chip.com, 1 page.
The Credit Chip 100, printed Dec. 21, 2006 from www.c-chip.com.
EEC-EN0F204RK Panasonic Electronic Components | P14164CT-ND | DigiKey. Web. Accessed Feb. 13, 2013. www.digikey.com/product-detail/en/EEC-EN0F204RK/P14164CT-ND/1937322.
Fogerson, R. et al. "Qualitative Detection of Opiates in Sweat by EIA and GC-MS". Journal of Analytical Toxicology. Oct. 6, 1997, vol. 21, No. 6, pp. 451-458(8) (Abstract).
De La Torre, R. et al. "Usefulness of Sweat Testing for the Detection of Cannabis Smoke." 2004 American Association for Clinical Chemistry, Inc. 29th Arnold O. Beckman Conference. Apr. 12-13, 2011. San Diego, CA.
Credit Chip 200G Series and The Credit Chip 200G Series, C-Chip Technologies Corp., date unknown.
C-Chip Technologies User Guide, C-Chip Technologies Corp., date unknown.

METHODS AND SYSTEMS RELATED TO REMOTE POWER LOSS DETECTION

CROSS-REFERENCE TO RELATED APPLICATIONS

This application is a continuation of U.S. patent application Ser. No. 14/552,631 titled "Methods and Systems Related to Remote Tamper Detection," filed Nov. 25, 2014, which is a continuation of U.S. patent application Ser. No. 13/828,182 titled "Methods and Systems Related to Remote Tamper Detection," filed Mar. 14, 2013 (now U.S. Pat. No. 8,928,471). Both applications are incorporated herein by reference as if reproduced in full below.

BACKGROUND

In situations where an individual has obtained financing for an asset, such as a vehicle, financing institutions may be interested in tracking the location of the asset. Tracking the location of the asset may be beneficial in ensuring the borrower does not abscond with the asset, or otherwise fails to make payments. Thus, advancements in tracking financed assets may result in a lower payment default.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device that connection may be through a direct connection or through an indirect connection via other devices and connections.

"Remote" shall mean one kilometer or more.

"Supercapacitor" shall mean one or more electrical components, either alone or in parallel, having a capacitive density of at least 3.0 millifarads per cubic millimeter (mF/mm$^3$).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to systems and methods of providing auxiliary power to an onboard device coupled to an asset, such as a vehicle. In particular, if someone tampers with the onboard device such that power to the onboard device is lost or significantly reduced, the onboard device will retain enough stored energy to send an alert related to tampering to a remote location. The developmental context is sending tamper alerts, and thus the specification will be based on the development context for onboard devices coupled to vehicles; however, the developmental context shall not be read as a limitation as to the applicability of the various embodiments. The specification first turns to a high level system overview.

Figure 1:
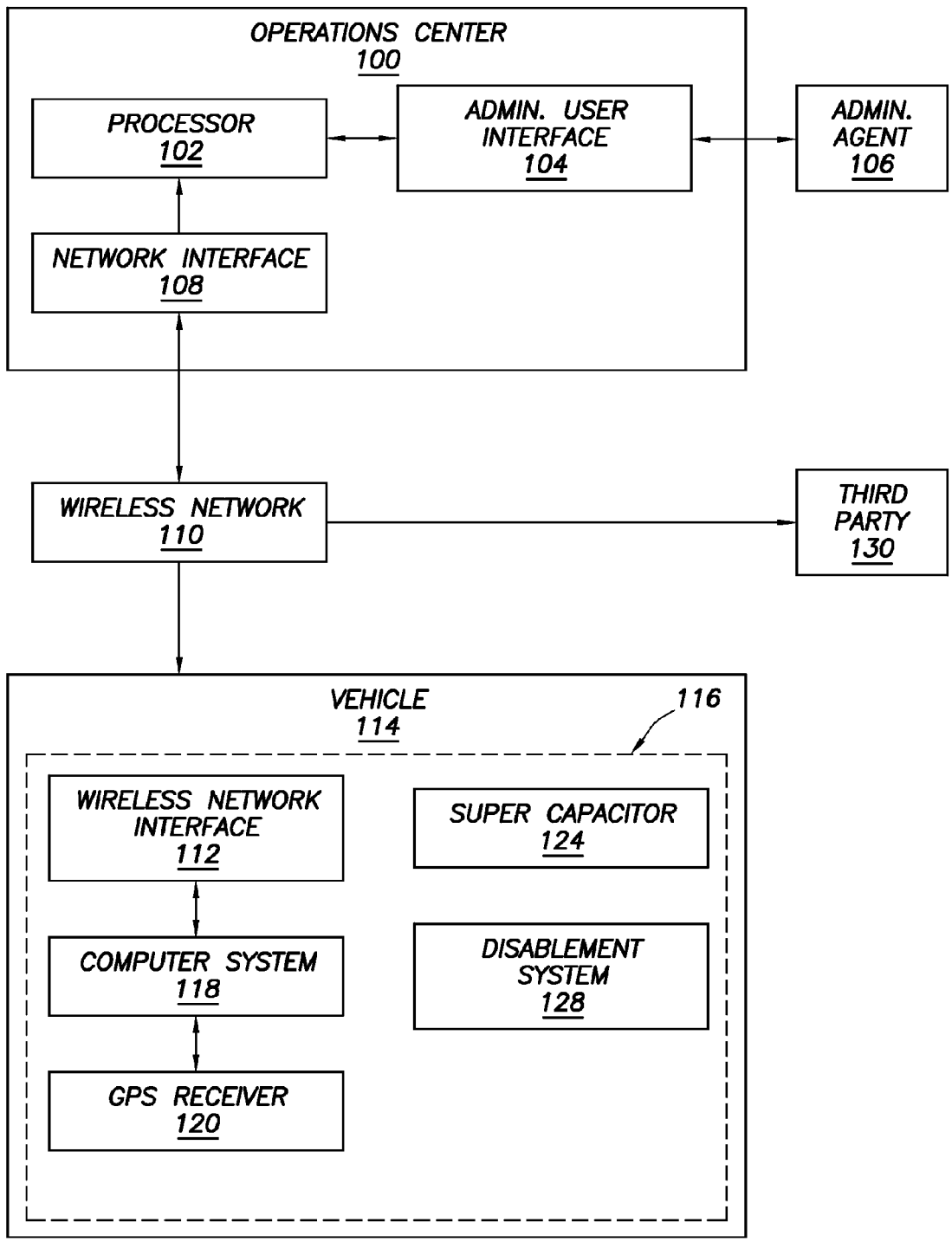
FIG. 1 shows, in block diagram form, a system in accordance with at least some embodiments.

FIG. 1 shows, in block diagram form, a system in accordance with at least some embodiments. In particular, the system comprises an operations center 100 communicatively coupled to a vehicle 114 by way of a wireless network 110. The operations center 100 comprises a processor 102. In some embodiments, the processor 102 may be a stand-alone computer system, or the processor may comprise a plurality of computer systems communicatively coupled and performing the functions of the operations center 100, the functions discussed more thoroughly below. The processor 102 may couple to an administrative user interface 104. The administrative user interface 104 may enable an administrative agent 106 to control or configure the operation of the system.

In one embodiment, in order to communicate with vehicle 114, the operations center 100 may further comprise a network interface 108 communicatively coupled to the processor 102. By way of the network interface 108, the processor 102, and any programs executing thereon, may communicate with vehicle 114, such as by wireless network 110. Wireless network 110 is illustrative of any suitable communications network, such as a cellular network, a Wireless Fidelity (Wi-Fi) network, or other mechanism for transmitting information between the operations center 100 and the vehicle 114.

In accordance with at least some embodiments, the operations center 100 is remotely located from the vehicle 114. In some cases, the operations center 100 and vehicle 114 may be located within the same city or state. In other cases, the operations center 100 may be many hundreds or thousands of miles from vehicle 114, and thus the illustrative wireless network 110 may span several different types of communication networks.

Still referring to FIG. 1, the system further comprises a vehicle 114 communicatively coupled to operations center 100 by way of the illustrative wireless network 110. The vehicle 114 may comprise onboard device 116, where onboard device 116 may have both location tracking capabilities and/or vehicle disablement capabilities.

In particular, onboard device 116 may comprise a computer system 118. Although not specifically shown, computer system 118 may comprise a processor, where the processor may communicate with subsystems of the vehicle, such as a computer system of the vehicle 114 (not specifically shown). An example onboard device 116 configured to couple to the OBD-II port may also have the ability to read or determine data associated with the vehicle 114, and may also have the ability to command computer systems of the vehicle to disable certain functions (e.g. starting, spark ignition, fuel system) such that the vehicle 114 may be disabled at the command of the onboard device 116, discussed in more detail below.

Onboard device 116 may further comprise a wireless network interface 112 coupled to the computer system 118. By way of the wireless network interface 112, programs executed by the computer system 118 may communicate with other devices. In some embodiments, the wireless network interface 112 enables the computer system 118 to communicate with operations center 100 by way of a wireless transmission through the wireless network 110. The wireless network interface 112 thus implements a wireless communication system and/or protocol.

In one embodiment, onboard device 116 may comprise a disablement system 128 that can selectively disable the vehicle 114. Disablement may take many forms. For example, the onboard device may disable the vehicle by disabling the spark ignition system, disabling the fuel pump relay, disabling by way of a starter interrupt, or a combination of disabling mechanisms. In other embodiments, the onboard device 116 may be a relay replacement device. For example, a starter relay is a device within a vehicle that, when activated, provides electrical current to the solenoid of the starter. In yet another case, the onboard device 116 may be a relay replacement device for any system that could disable the vehicle (e.g., either prevents the motor from starting, or prevents the motor from continuing to operate).

In addition, onboard device 116 may disable vehicle 114 on command from the operations center 100. In particular, the operations center may comprise disablement services described above, and at the request of any authorized entity (e.g., an administrative agent, a lending institution, a dealership), vehicle 114 may be disabled.

The onboard device 116 further comprises a global position system (GPS) receiver 120 coupled to computer system 118. The GPS receiver 120 receives signals from an array of GPS satellites orbiting the earth, and based on timing associated with arrival of those signals, a location of the onboard device 116 (and thus the vehicle 114) can be determined. In some cases, the GPS receiver 120 has sufficient functionality to calculate location, and thus the data passed to computer system 118 may be a direct indication of location. In other cases, the functionality to determine location may be shared between the GPS receiver 120 and software executing on the processor 102, by way of wireless network 110. That is, the GPS receiver 120 may receive the plurality of GPS signals and pass the information to a program on the processor 102, which program may then make the determination as to location of the onboard device 116, and thus the vehicle 114.

In one embodiment, the onboard device 116 tracks the vehicle with high precision, thus one may be able to identify the street and block at which the vehicle is passing at any given time (though the onboard device 116 may not necessarily have or contain street level databases). In other cases, the onboard device 116 may act only to determine the endpoints of each trip. In another embodiment, location tracking may be accomplished by way of cellular signal triangulation.

In some cases, the location determined by the onboard device 116 may only be a position on the face of the earth, for example, latitude or longitude. The operations center 100, receiving a stream of locations from the onboard device 116, may correlate to streets and addresses. In other cases, the onboard device 116 may have sufficient memory and computing functionality to not only determine position in a latitude and longitude sense, but also to correlate the positions to cities, streets, block numbers and addresses. Regardless of how the location tracking is accomplished, it may be utilized as a way to locate and, in some cases, aid in retrieving the vehicle for repossession in the event of a non-payment.

Consider the following example situation. A driver purchases vehicle 114 by receiving financing from a financing institution (e.g., a bank, a dealership). The financing institution may request that onboard device 116 be installed within vehicle 114 to track the location of the vehicle and/or to disable the vehicle in the event of a non-payment. The driver, aware of the possibility of disablement or repossession in the event of a non-payment, may attempt to tamper with onboard device 116 by disconnecting the external power source (such as from the vehicle battery) to the onboard device, or by removing the onboard device from the vehicle completely.

In order to frustrate potential tampering of the onboard device, the onboard device may be located in an inconspicuous location, such as within an electrical compartment under the hood or within the luggage compartment. On the other hand, the onboard device may also be located in a more conspicuous location, such as under the dashboard of the vehicle.

If a driver does disconnect power to the onboard device, the onboard device may recognize the loss of external power as a tampering event, and may send any of a plurality of messages, data, and/or alerts to the operations center 100 or to a third party 130 (e.g., an administrative agent, a lending institution, or a vehicle dealership). In particular, the onboard device may send an indication of last known location, the last known voltage provided to the onboard device before the power loss, and/or an indication of the trend of voltage provided to the onboard device before the power loss.

Due to the fact the onboard device is, at least in some embodiments, powered by a source of power of the vehicle, disconnecting the onboard device from the power may render the onboard device lacking in enough power to send messages and alerts related to tampering. To combat the issue, the onboard device comprises an auxiliary short-term power source. In one embodiment, the auxiliary power source may be a battery, such as a lithium-ion battery; however, the use of a battery may have several drawbacks. In particular, a lithium-ion battery may be restricted by temperature; when the temperature is low, the battery power may be reduced, and when the temperature is too high, the lifespan of the battery may be severely depleted. Furthermore, continuous charging cycles of a lithium-ion battery may result in a shortened lifespan, thus resulting in the extra cost and wasted time of replacing batteries. In another embodiment, the auxiliary short-term power source may be one or a series of capacitors; however, the amount of physical volume needed for related-art capacitors of sufficient capacity to operate the onboard device, even for a short period of time, may be prohibitive.

In other cases, the auxiliary power source for the onboard device may be a supercapacitor, where the supercapacitor is a capacitor having a high energy density. For example, the supercapacitor 124 shown in FIG. 1 may be a 0.2 Farad capacitor having an energy or capacitive density of at least 3.0 millifarads per cubic millimeter ($mF/mm^3$). When the onboard device is connected to the external power source (i.e., the vehicle battery), supercapacitor charges. The interplay between the vehicle battery, the supercapacitor, and the onboard device is shown in more detail in FIG. 2.

Figure 2:
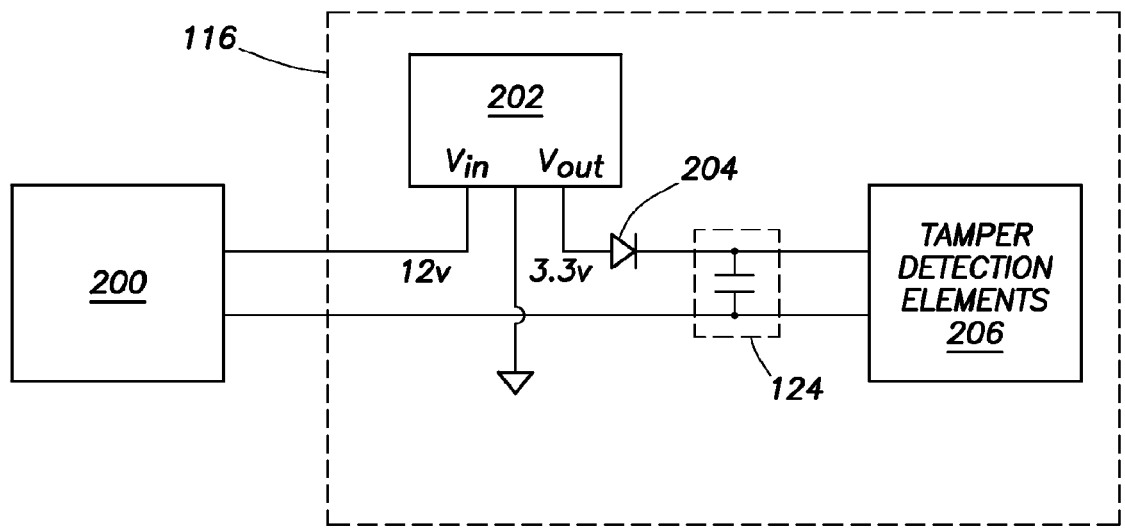
FIG. 2 shows, in block diagram form, a circuit diagram in accordance with at least some embodiments.

FIG. 2 shows, in block diagram form, a high level circuit diagram. In particular, onboard device 116 may receive power from vehicle battery 200. In this specific example, the input voltage to the onboard device 116 (shown within the dotted line) may be 12 volts from the vehicle battery. Voltage regulator 202 converts the incoming voltage to approximately 3.3 volts in example systems, though any internal voltage may be used. A diode 204 serves to prevent a backflow of current from the supercapacitor 124 during periods of time when battery 200 has been disconnected from the onboard device 116.

While connected to the vehicle battery 200, the supercapacitor 124 charges and the onboard device 116, including tamper detection elements 206, receive operating power from the vehicle battery. The tamper detection elements 206 may comprise a plurality of elements used in tamper detection, location tracking, and disablement. Although specifics regarding the tamper detection elements 206 will be described in more detail below, in general, while connected to the vehicle battery, any or all of the elements of the onboard device may be receiving operating power; however, in the situation where external power has been lost, in order to conserve power stored on the supercapacitor only some of the elements of onboard device 116 (tamper detection elements 206) may receive power from the supercapacitor 124.

Figure 3:
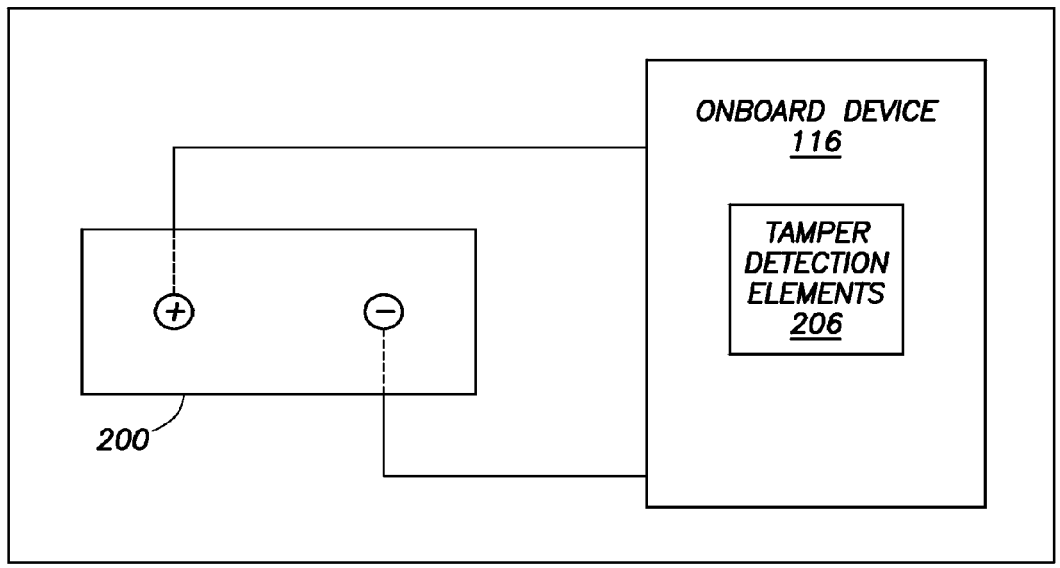
FIG. 3 shows, in block diagram form, a system in accordance with at least some embodiments.

FIG. 3 shows, in block diagram form, a high level overview of an example embodiment. In particular, onboard device 116 is shown as connected to, and receiving power from, vehicle battery 200. In addition, a plurality of tamper detection elements 206, coupled to the onboard device, are also receiving power from the vehicle battery 200. For example, while the onboard device is receiving power from the vehicle battery, all the electrical components of the onboard device 116 may be receiving power from the battery 200, including the tamper detection elements. In addition during the time the onboard device is receiving power from the vehicle battery, the supercapacitor coupled to the onboard device is charging or charged.

Figure 4:
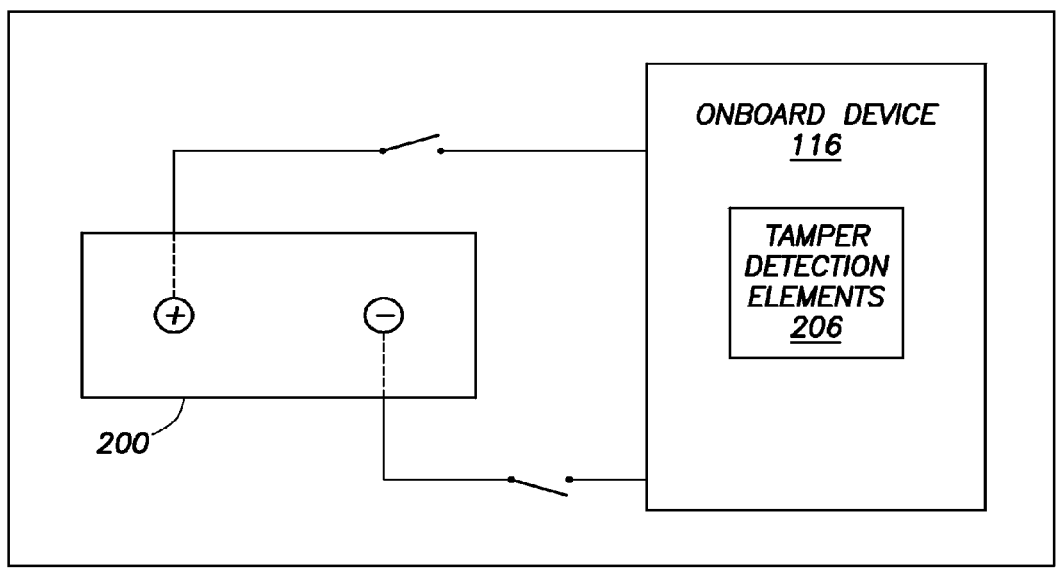
FIG. 4 shows, in block diagram form, a system in accordance with at least some embodiments.

FIG. 4 shows, in block diagram form, a high level overview of an example embodiment. In particular, the onboard device 116 has been disconnected from the vehicle battery (such as by a person tampering with the device), and the onboard device 116 is thus no longer receiving power from the external source. During a period of time after the vehicle battery is not providing power to the onboard device, the onboard device is powered by the supercapacitor until such time as the supercapacitor no longer maintains a charge. Due to the amount of charge the supercapacitor can maintain, it is possible that the onboard device may only be powered for small finite period of time, such as three to four seconds after the loss of external power. As a result, in order to ensure the messages and data related to tampering are able to be transmitted to the operations center or third party, the onboard device may execute instructions to provide power to only the tamper detection elements 206 needed for retrieval of power loss relevant information and wireless transmission of messages related to the loss of power.

In one embodiment, the last known location of the onboard device received by the GPS receiver may be stored in memory on the computer system 118. Thus, in an external power loss situation, the onboard device, now powered by the supercapacitor, may shut down power to the GPS receiver and rely on the last stored indication of location in memory. In another embodiment, the onboard device may execute instructions to power down the disablement system 128. Thus, during the time the onboard device is powered by the supercapacitor, the supercapacitor may be providing power solely to the computer system (or a portion of the computer system) and the wireless network interface.

Regardless of which elements of the onboard device receive power from the supercapacitor, if external power is lost to the onboard device, the supercapacitor provides enough power for the onboard device to send a message regarding the power loss. In one embodiment, the onboard device, detecting a power loss, may wirelessly transmit an indication of the last known location of the vehicle, where the last known location of the vehicle may aid in locating the vehicle for repossession. In another embodiment, the onboard device may wirelessly transmit an indication of the last known voltage provided by the vehicle battery before the loss of power. In yet another embodiment, the onboard device may wirelessly transmit an indication of the trend of voltage provided by the vehicle battery prior to the power loss. Data and messages transmitted from the onboard device to the operations center and/or the third party may alert the operations center and/or third party to a potential tamper situation.

Not every power loss to the onboard device 116 is indicative of tampering. Thus, onboard device 116 may send data to the operations center and/or a third party in order to provide context for analysis of the power loss situation. For example, in addition to sending an indication of last known location, the onboard device may send a value indicative of the last known voltage prior to the power loss, and/or a value indicative of the trend of voltage for a predetermined period of time prior to the power loss (e.g., the minute before power loss is detected). In another embodiment, the onboard device 116 may periodically send an indication of the voltage during periods of time when the vehicle battery is supply power. Thus, the trend of voltage may be determined and/or analyzed by the operations center. On the other hand, the onboard device may have the capability to analyze the situation to determine whether the power loss is or is not indicative of tampering.

Figure 5:
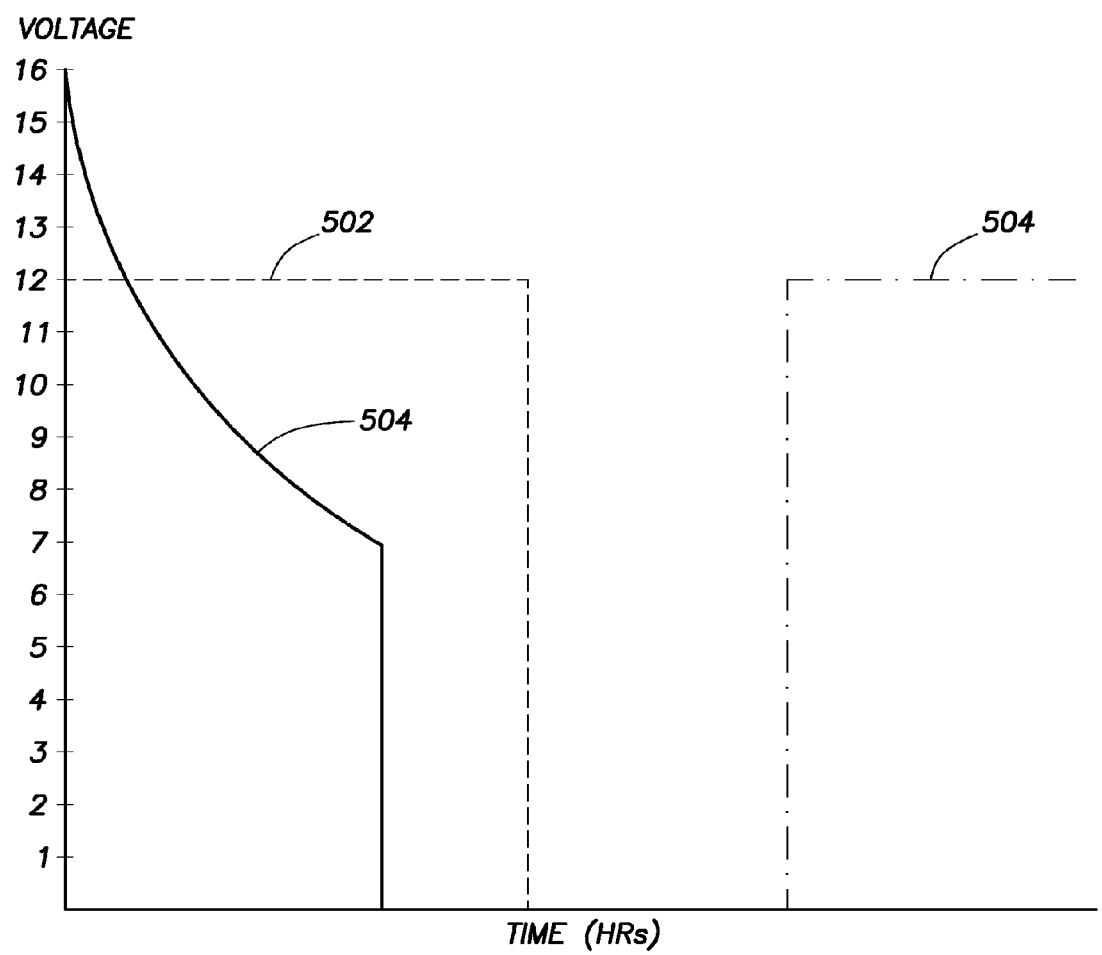
FIG. 5 shows a graph in accordance with at least some embodiments.

FIG. 5 shows example voltages over time for plurality of power loss situations. In particular, FIG. 5 shows, in graphical form, three example voltage trend lines for the onboard device 116 receiving voltage from the vehicle battery. A sudden change from constant 12 volts to zero volts, as shown by dashed line 502, may be indicative of a tamper situation. In this example situation, the supercapacitor would power the tamper detection elements of the onboard device to send off appropriate tamper related messages to the operations center and/or third party. In particular, the onboard device may send an indication of the last known location of the onboard device, the last known voltage before the power loss, and/or an indication of a trend of voltage before the power loss.

In the example situation related to dashed line 502, the last known voltage and trend of voltage are both approximately 12 volts; thus, the sudden change of voltage between 12 volts and zero volts may be indicative of disconnecting the onboard device 116 from the external power supply, and likely indicates tampering with the device. The likelihood of tamper in any particular situation may be analyzed at the operations center, by the onboard device 116, or both.

FIG. 5 further illustrates another potential situation by solid line 504. In this example, the voltage trend of a negative slope before a voltage drop to zero may be indicative of a problem with the battery, such as degradation due to extreme temperatures, or a slow drain on power resulting from leaving a cabin light on in the vehicle. Because there is not a sudden drop in voltage from a fully charged state, but rather a trend of power loss, the example shown by line 504 is likely not indicative of a tamper situation. Nevertheless, in the example situation related to dashed line 504 the onboard device 116 (powered by supercapacitor 124) may still send a message to the operations center with any or all the previously discussed information. In another example system, however, the onboard device 116 may judge the situation as not a tamper situation, and refrain from sending the tamper message in spite of the loss of power to the onboard device 116.

In other cases, the last known voltage and the trend of voltage determined at the time power is lost to the onboard device may initially seem like a tamper situation (i.e., dashed line 502), but may later be indicative of a legitimate, non-tamper situation. In particular, the onboard device may recognize a sudden drop in voltage and power loss, as shown by line 502, and thus, the onboard device reacts by sending tamper related messages to the operations center and/or third party. A short time later, the vehicle battery may be reconnected to the onboard device. The onboard device reacts to the power being restored by sending a message to the operations center and/or third party that power has been restored. In addition, the onboard device may send data related to the new trend in voltage, as shown by dashed-dot-dashed line 504. This example situation, while initially indicative of tampering, the power loss notification may actually be indicative of a legitimate power loss, such as routine maintenance on the vehicle. A situation where the time between the loss of power and the regain of power is short, such as 10 or fewer seconds, is more likely indicative of a legitimate hiccup in the power. Additionally, a temporary power loss of a couple of hours may be indicative of maintenance. On the other hand, however, the longer the period of time between the loss of power and the regain of power, the more likely there has been tampering with the onboard board device. Thus, the message received by the remote operations center and/or by the third party of the return of power provides additional analytical context.

In addition to an analysis of voltages over time, other contextual evidence may be used to determine whether a loss of power is indicative of a tampering event. For example, the onboard device may detect whether the starter has been engaged within a predetermined time period prior to the power loss (e.g., 10 seconds or less). A situation in which the starter has been engaged shortly before the loss of power is more likely indicative of a problem with the battery, and thus more likely of a legitimate power loss. Alternatively, if the onboard device has not detected any attempt to start the vehicle before a power loss is detected, it is more likely that a tampering event has occurred.

Although the above description has discussed ascertaining whether tampering has occurred with regard to a single onboard device, any number of onboard devices in the system may be contemplated.

Figure 6:
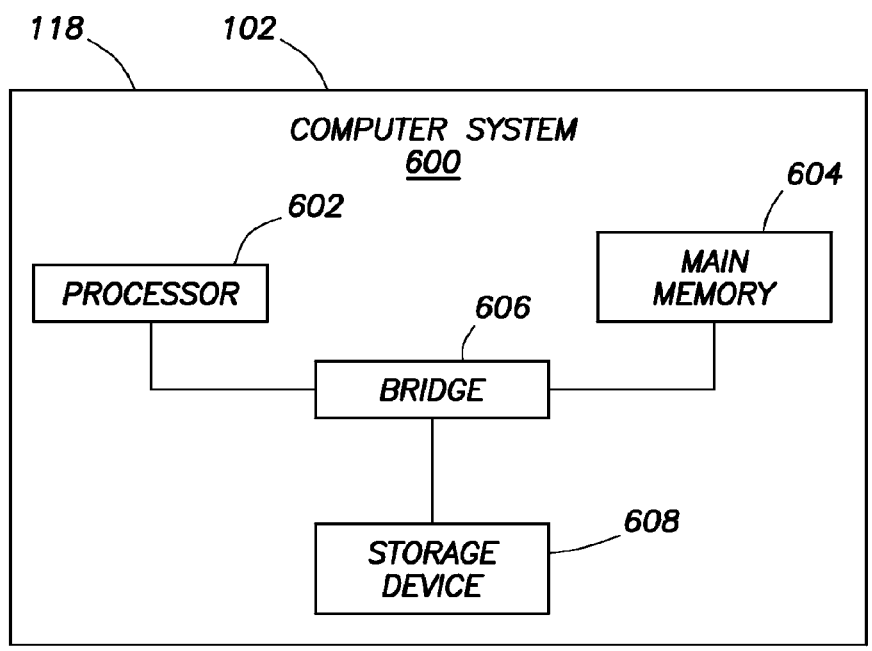
FIG. 6 shows a computer system in accordance with at least some embodiments.

FIG. 6 shows a computer system 600, which is illustrative of a computer system upon which the various embodiments may be practiced. The computer system 600 may be illustrative of, for example, computer system 118 coupled to the onboard device 116. In yet another embodiment, computer system 600 may be illustrative of processor 102. In particular, computer system 600 comprises a processor 602, and the processor couples to a main memory 604 by way of a bridge device 606. Moreover, the processor 602 may couple to a long term storage device 608 (e.g., a hard drive, solid state disk, memory stick, optical disc) by way of the bridge device 606. Programs executable by the processor 602 may be stored on the storage device 608, and accessed when needed by the processor 602. The program stored on the storage device 608 may comprise programs to implement the various embodiments of the present specification, such as sending an indication of the last known location of vehicle 114 in the event of device tampering. In some cases, the programs are copied from the storage device 608 to the main memory 604, and the programs are executed from the main memory 604. Thus, the main memory 604, and storage device 608 shall be considered computer-readable storage mediums.

Figure 7:
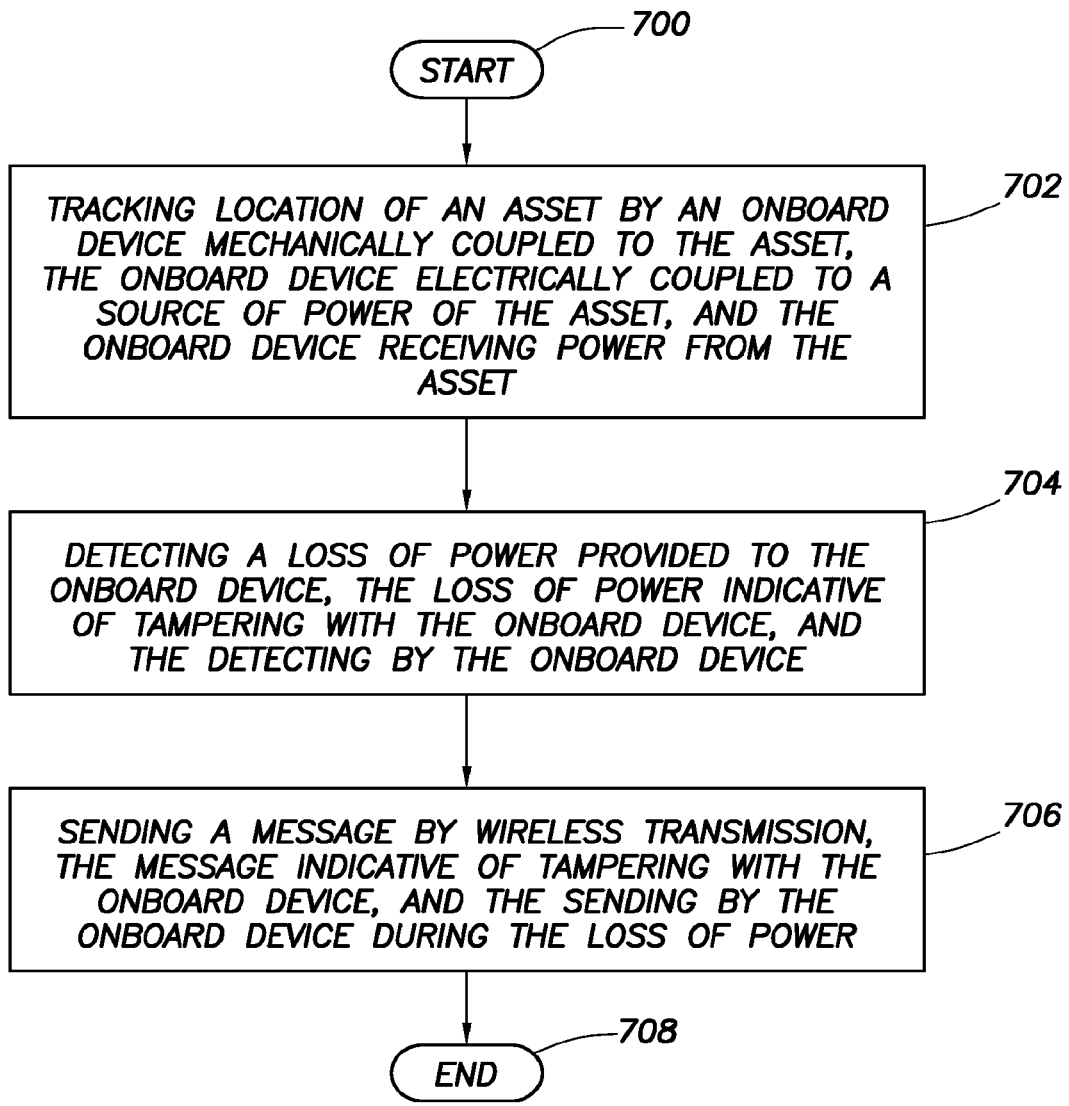
FIG. 7 shows, in block diagram form, a method in accordance with at least some embodiments.

The method of remote tamper detection will now be discussed in more detail. FIG. 7 shows a flow diagram depicting an overall method of detecting tampering and issuing an alert related to the tampering. The method starts (block 700) by tracking location of an asset by an onboard device mechanically coupled to the asset, the onboard device electrically coupled to a source of power of the asset, and the onboard device receiving power from the asset (block 702); detecting a loss of power provided to the onboard device, the loss of power indicative of tampering with the onboard device, and the detecting by the onboard device (block 704); and sending a message by wireless transmission, the message indicative of tampering with the onboard device, and the sending by the onboard device during the loss of power (block 706). Thereafter, the method ends (block 708).

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments," or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, the various embodiments have been described in terms of remote tamper detection. This context, however, shall not be read as a limitation as to the scope of one or more of the embodiments described—the same techniques may be used for other embodiments. It is intended that the following claims be interpreted to embrace all such variations and modifications.

We claim:

1. A method comprising:
   charging a supercapacitor of an onboard device coupled to an asset, the charging from a source of power of the asset; and then
   detecting tampering with the onboard device by a complete loss of power from the source of power, the detecting by the onboard device; and after the complete loss of power
   utilizing power from the supercapacitor to send a message by wireless transmission, the message including an indication of a last known voltage provided by the source of power prior to the complete loss of power.

2. The method of claim 1 wherein utilizing power further comprises utilizing power from the supercapacitor for at least 3 seconds after the complete loss of power.

3. The method of claim 1 wherein utilizing power from the supercapacitor to send the message further comprises:
   receiving signals indicative of a location of the onboard device at the time of complete loss of power, the receiving by the onboard device; and
   sending an indication of location of the onboard device, the location derived from the signals.

4. The method of claim 1 wherein utilizing power from the supercapacitor to send the message further comprises sending a last known location of the onboard device prior to the complete loss of power.

5. The method of claim 1 utilizing power from the supercapacitor to send the message further comprises sending an indication of a trend of voltage provided by the source of power prior to the complete loss of power.

6. The method of claim 1 wherein detecting tampering further comprises detecting tampering as the complete loss of power when, within a predetermined time prior to the complete loss of power, the voltage of a battery of the asset indicates a charged state.

7. The method of claim 6 wherein the predetermined time is one minute.

8. The method of claim 1 further comprising, responsive to detecting tampering, powering off at least one component of the onboard device not involved in sending the message.

9. An onboard device configured to couple to an asset, the onboard device comprising:
    a processor;
    a wireless interface coupled to the processor;
    a global position receiver coupled to the processor;
    a means for providing power coupled to the processor;
    a memory coupled to the processor, the memory storing a program that, when executed by the processor, causes the processor to:
        receive signals indicative of a location of the onboard device;
        detect a complete power loss to the onboard device; and then
        sending a message by way of the wireless interface, the sending powered by the means for providing power, and the message including an indication of a last known voltage provided by the asset prior to the complete power loss.

10. The onboard device of claim 9 wherein the means for providing power is a supercapacitor.

11. The system of claim 10 wherein the supercapacitor has a capacitive density of at least 3 millifarads per cubic millimeter.

12. The system of claim 9 wherein the means for providing power further comprises a means for providing power for at least 3 seconds after the complete power loss.

13. The system of claim 9 wherein when the processor sends the message, the program further causes the processor to send an indication of location of the onboard device, the location derived from the signals.

14. The system of claim 9 wherein when the processor sends the message, the program further causes the processor to send an indication of a trend of voltage provided by the asset prior to the complete power loss.

15. The system of claim 9 wherein, responsive to detecting the complete power loss, the program further causes the processor to power off at least one component of the onboard device not involved in issuing the alert.

\* \* \* \* \*